(12) United States Patent
Barker

(10) Patent No.: US 6,923,390 B1
(45) Date of Patent: Aug. 2, 2005

(54) SWING ARM GUIDANCE SYSTEM

(75) Inventor: Luke J. Barker, Deshler, NE (US)

(73) Assignee: Reinke Manufacturing Company, Inc., Deshler, NE (US)

( * ) Notice: Subject to any disclaimer, the term of this patent is extended or adjusted under 35 U.S.C. 154(b) by 0 days.

(21) Appl. No.: 10/814,829

(22) Filed: Mar. 31, 2004

(51) Int. Cl.[7] .............................. B05B 3/00; B05B 3/18; G01C 21/00; G01S 3/14; G06G 7/78
(52) U.S. Cl. ...................... 239/729; 239/728; 701/215; 701/216
(58) Field of Search .............................. 239/729, 728, 239/722, 723, 726, 730–733, 739–743, 173; 701/215, 216, 50, 207, 213, 214; 700/284

(56) References Cited

U.S. PATENT DOCUMENTS

| | | | |
|---|---|---|---|
| 3,797,517 A | 3/1974 | Kircher et al. | |
| 3,902,668 A | 9/1975 | Daugherty et al. | |
| 4,340,183 A | 7/1982 | Kegel et al. | |
| 5,884,224 A * | 3/1999 | McNabb et al. ............... | 702/2 |
| 6,095,439 A | 8/2000 | Segal et al. | |
| 6,254,018 B1 * | 7/2001 | Ostrom ........................ | 239/731 |
| 6,290,151 B1 | 9/2001 | Barker et al. | |
| 6,512,992 B1 * | 1/2003 | Fowler et al. ............... | 702/150 |
| 6,726,132 B2 * | 4/2004 | Malsam ....................... | 239/729 |
| 2002/0134868 A1 * | 9/2002 | Hansen ........................ | 239/728 |

* cited by examiner

*Primary Examiner*—Steven J. Ganey
*Assistant Examiner*—Darren Gorman
(74) *Attorney, Agent, or Firm*—G. Brian Pingel; Camille L. Urban

(57) ABSTRACT

A guidance system for controlling the steering of a swing arm on a center pivot irrigation system is provided through the use of two satellite signal receiving antennas associated with a drive tower for the swing arm. The signal receiving antennas are mounted from the swing tower so that one of the antennas is in a position forwardly of a steerable wheel for the tower and the other antenna is located in a position rearwardly of the steerable wheel. The signal receiving antennas are mounted in such fashion that they rotate in a direct relation to the steering of the steerable wheel so as to provide position information for the steering of the drive tower that more efficiently and effectively maintains the drive tower on a desired path of travel.

10 Claims, 6 Drawing Sheets

SWING ARM GUIDANCE SYSTEM

BACKGROUND OF THE INVENTION

1. Field of the Invention

The present invention relates in general to center pivot irrigation systems having swing arms for providing water to the corners of a field and more specifically relates to a guidance system that is utilized for controlling the travel of the swing arm on a desired path.

2. Description of the Prior Art

Center pivot irrigation systems have long been known in the art for providing water to large sections of land. A typical center pivot system is capable of irrigating one hundred and sixty acres or more. A center pivot system is formed of a main arm water conduit that is fixed at one end to a central point of water supply. The main arm is supported on a plurality of wheeled towers and is pivotally attached to the source of water to provide a circular irrigation pattern surrounding such supply.

Center pivot irrigation systems have proven to be highly efficient in irrigating large sections of land. They suffer from the deficiency that they produce a circular water pattern, although most fields are either rectangular or square shaped. Accordingly, a center pivot system by itself will not be able to provide water to the corners of a field, resulting in decreased production or complete loss of production therein. To increase the amount of area that can be watered by a center pivot system, high pressure sprayers known as end guns have been mounted on the end of the center pivot main arm and are actuated at the corners to produce a water spray into only a portion of the corners. Due to this fact, end guns are not an effective or efficient method for watering the corners and improved corner watering systems have been desired.

In the 1970's, the use of an additional watering arm (called a swing arm) was begun, with the swing arm being pivotally attached to the free end of the main arm to pivot out into the corners as desired. A variety of different methods for steering and driving the swing arm have been developed, but the most successful and predominantly used system for controlling the movement of the swing arm is through the use of an electromagnetically charged cable that is buried in the ground along the path that the swing arm is desired to follow. See U.S. Pat. No. 3,902,668 to Daugherty, et al.

Through the use of buried cable controls, swing arm center pivot irrigation systems have been improved in efficiency and operation. Nevertheless, there are certain drawbacks in such systems, particularly in instances where the topsoil of a field may overlie a rock substrata. In view of the fact that a buried cable system requires the laying of ten thousand or more feet of cable, when rock is present in a field, installation of the buried cable becomes unusually difficult and expensive. It is also very expensive to repair or to alter the path of the system once the cable is buried.

Other methods used to steer the swing arm include the use of encoders and angle comparisons or electrical control means with banks of switches and settings for the desired paths. See U.S. Pat. No. 4,340,183 to Kegel and U.S. Pat. No. 3,797,517 to Kircher, respectively.

Until recently the use of Global Positioning Satellite (GPS) data to guide the swing arm of a center pivot irrigation system would have been impractical from the standpoint that such position calculations were too inaccurate and GPS receiver/senders were prohibitively expensive. However, with advancements in GPS technology, systems have now been developed for guiding a swing arm along a desired preselected path.

One example of a prior art swing arm guidance system is disclosed in U.S. Pat. No. 6,095,439 issued to Segal, et al. A second known swing arm guidance control GPS system is disclosed in U.S. Pat. No. 6,290,151 B1 issued to Barker, et al. Both of these prior art patents disclose guidance systems that include a single GPS receiving antenna positioned on the swing tower in a location between the wheels of the tower. However, locating the swing tower receiving antenna in such position is detrimental to optimum guidance of the swing tower.

The present invention is designed to provide a new and improved guidance system for the steering control of a swing arm on a center pivot system that overcomes the deficiencies of the prior art.

SUMMARY OF THE INVENTION

The present invention involves a guidance system for providing a steering control of a swing arm on a center pivot irrigation system having a main arm water conduit with one end pivotally connected to a known central point of water supply at a known location and supported on at least one movable tower. The guidance system includes a pivot satellite signal receiving means for producing position information representative of the calculated position of the known central point and a comparator means for comparing the known position of the central point with the calculated position information of said point and then generating an error signal representative of the difference therebetween.

A swing arm satellite signal receiving means is mounted from a swing tower for said swing arm and extends outwardly therefrom for producing position information representative of the calculated position of the swing arm. A first processing means is employed for using the error signal produced by the comparator means to adjust the position information produced by the swing arm receiving means to generate corrected swing arm position information.

In the preferred embodiment an antenna of the swing arm receiving means is mounted in a position forward of one of the steerable wheels of the swing tower and is adapted to pivot in a direct relation to the pivoting of the wheels to improve the operation of the system.

The foregoing and other advantages of the present invention will appear from the following description. In the description, reference is made to the accompanying drawings, which form a part hereof, and in which there is shown by illustration and not of limitation a specific form in which the invention may be embodied. Such embodiment does not represent the full scope of the invention, but rather the invention may be employed in a variety of other embodiments and reference is made to the claims herein for interpreting the breadth of the invention.

DETAILED DESCRIPTION OF THE PREFERRED EMBODIMENT

Figure 1:
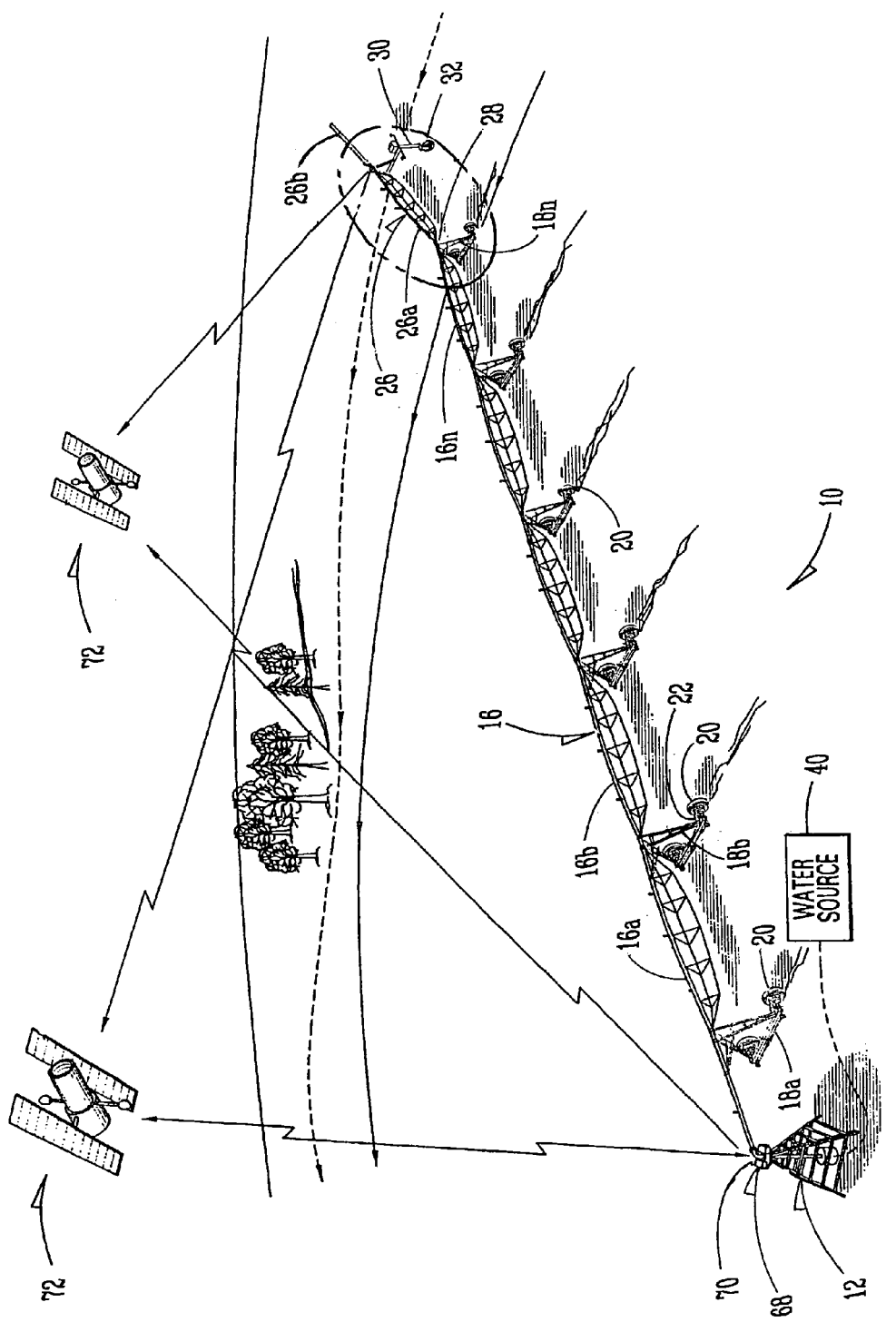
FIG. 1 is a simplified pictorial diagram showing a center pivot irrigation system with a main boom and a swing arm that is controlled by the guidance system of the present invention and two GPS satellites that are used by such guidance system.
Figure 2:
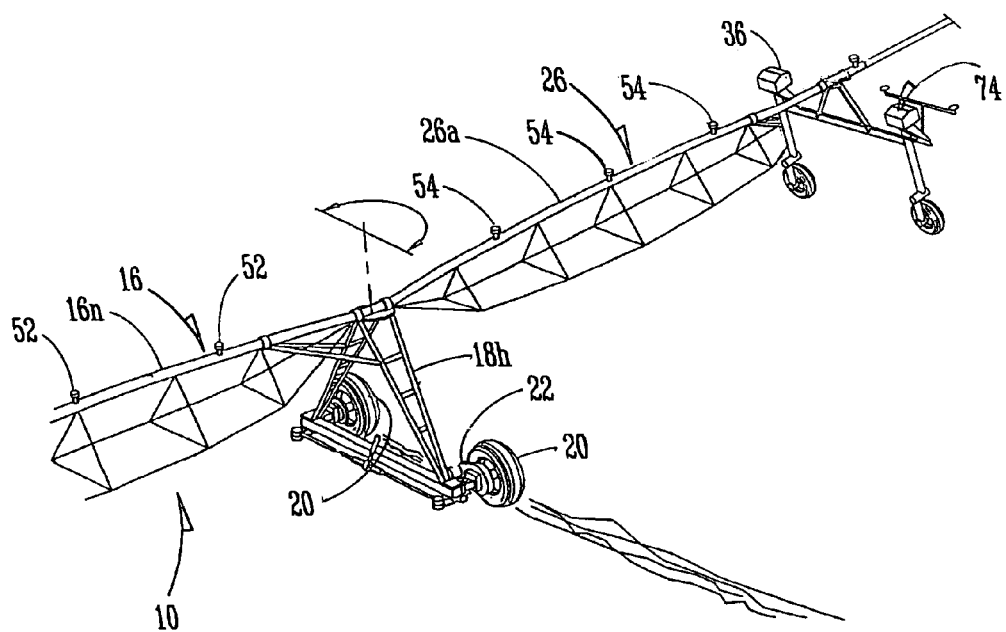
FIG. 2 is a more detailed view of the swing arm and guidance system of FIG. 1.

FIG. 1 shows a swing arm center pivot irrigation system generally at 10. A center pivot 12 for the system 10 is stationary and connected to a main boom 16 which can be comprised of several separate boom sections 16a, 16b . . . 16n. Such boom sections are supported by means of supporting towers 18a through 18n, each of which have wheels 20 and drive motors 22. A swing arm 26 (best shown in FIG. 2) is comprised of boom section 26a and 26b and is pivotally connected at 28 to the outer end of the boom section 16n. The swing arm 26 is supported by a swing tower 30 which has wheels 32 that are in a tandem relationship. The wheels 32 on the tower 30 are steerable by the use of steering means 36 (see FIGS. 2 and 4) and are driven by electric motors (not shown) in a response to movement of the main boom 16 with respect to the swing arm 26 as is well-known in the art.

The center pivot 12 is connected to a source of water, such as a well 40. Water is supplied from the well 40 along the lengths of the main boom 16 and the swing arm 26 for delivering a desired amount of water to sprinkler heads such as shown respectively at 52 and 54 in FIG. 2.

Figure 3:
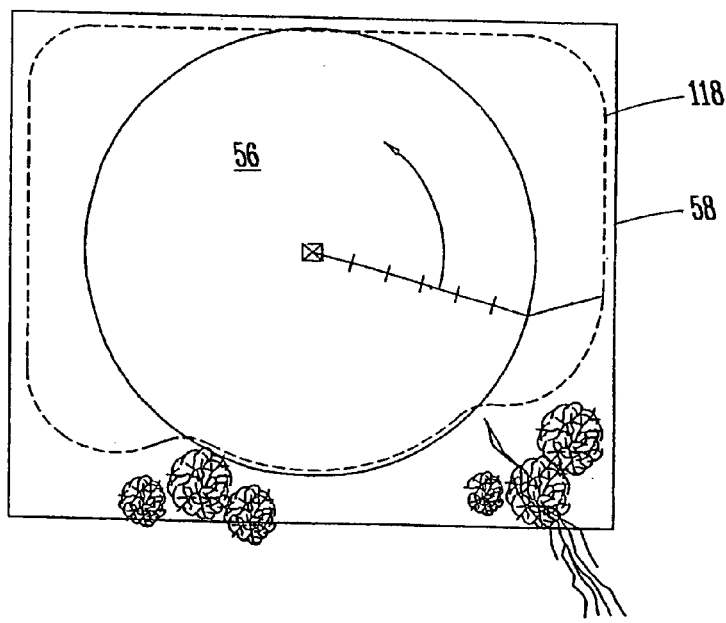
FIG. 3 is a diagrammatic representative view of the paths that the swing arm and main boom will travel.

As indicated in FIG. 3, the main boom 16 is only capable of covering a circular area 56 of a field 58 around the center pivot 12. When pivoted about the outer end of the outer section 16n, the swing arm 26 permits irrigation of a section of the field 58 outside of the circular area 56. The present invention is designed to provide an efficient and accurate guidance system for controlling movement of the swing arm 26 and a preferred embodiment of the guidance system of the present invention will now be described.

In the preferred embodiment, the swing arm guidance system has a base unit 68 (FIG. 1) that includes a center pivot satellite signal receiving means 70 mounted on the center pivot 12, although theoretically, the receiving means 70 could be located in any known relatively near, stationary position. Preferably, the means 70 is a Trimble BD750 RTK GPS Receiver with an L1/L2 antenna. Prior to operation of the system 10, the means 70 is programmed with its exact latitude and longitude coordinates.

The signal receiving means 70 is capable of receiving position signals from a number of global positioning satellites 72 (only two of which are shown in FIG. 1) and generating a correction factor every second based upon a comparison of its programmed known position and that received through the GPS satellites 72.

Figure 4:
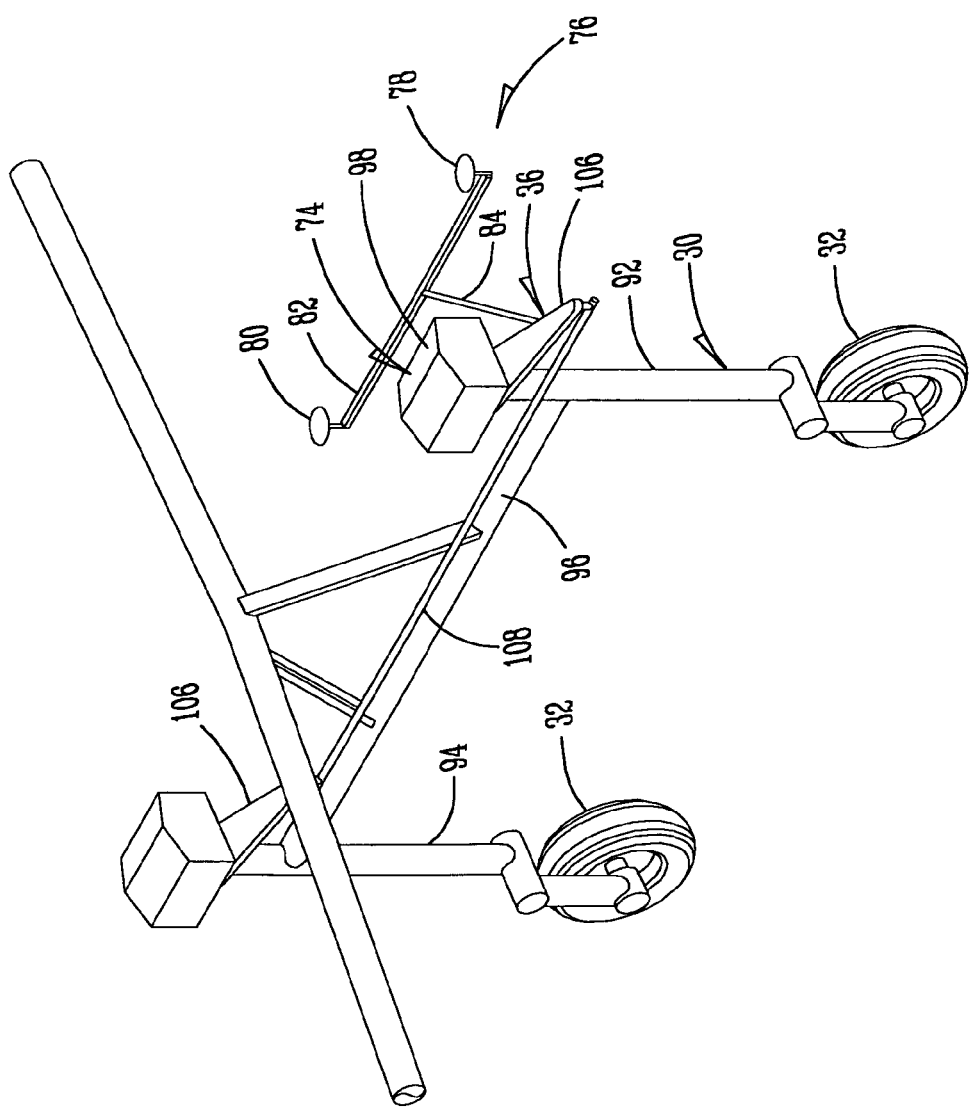
FIG. 4 is a perspective view of a swing tower of the swing arm.

The correction factor produced by the receiving means 70 is supplied via an electrical cable, not shown, to a rover unit 74 (FIG. 2) mounted on the swing tower 30. Associated with the unit 74 is a swing tower satellite signal receiving means 76 as seen in FIGS. 4 and 5.

Figure 5:
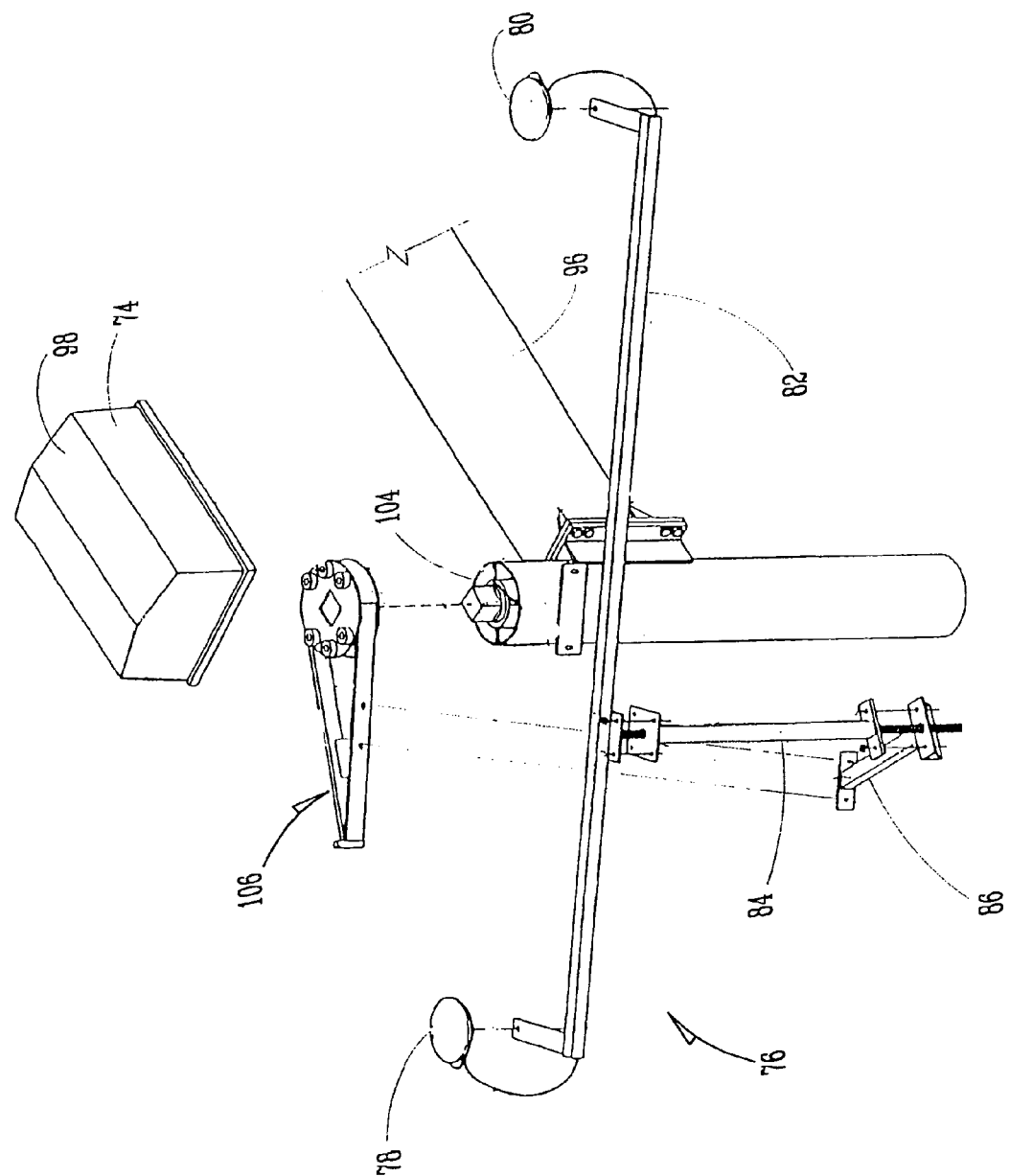
FIG. 5 is a partial exploded view in perspective of the top portion of the swing tower.

As shown best in FIG. 5, the swing tower receiving means 76 includes forward and reverse GPS receiving antennas 78 and 80 respectively that are mounted on opposite ends of a cross arm 82 that is approximately eight feet long. A vertically aligned mast 84 connects between the cross arm 82 and a bracket assembly 86 for attaching the mast 84 to the swing tower 30 in such fashion so that the receiving means 76 will pivot during steering of the swing tower 30 as will now be described.

Referring again to FIG. 4, the swing tower steerable wheels 32 are mounted at the lower ends of vertically aligned struts 92 and 94 that are connected together at their upper ends by a cross beam 96. As is well known in the art, a steering motor housing 98 is mounted on the top end of the wheel strut 92 and is associated, as indicated in FIG. 5, with a wheel steering axle 104, one of which is also contained in the wheel strut 94 for transferring the operation of the steering motor to steer the wheels 32.

Associated with each of the steering axles 104 are steering arms 106 that are affixed to the axles 104 so that they rotate in a direct relationship to rotation of the steering axles 104. To allow the use of only one steering motor for the swing tower 30 a steering tie-rod 108 (see FIG. 4) is attached to the steering arms 106. Thus, when the steering motor applies a steering force on the associated axle 104 and the steering arm 106, such force is transmitted by the tie-rod 108 to the other steering arm 106 to cause the steering movement of the wheels 32 to be synchronized.

Referring again to FIG. 5, the swing tower receiving means 76 is mounted to the steering arm 106 by the bracket assembly 84 in such position that the cross arm 82 is always in a parallel alignment with the steerable wheels 32 and the path of travel thereof. Accordingly, when the steering arms 106 are pivoted during steering movement of the wheels 32, the signal receiving means 76 likewise is pivoted in a direct relationship to the pivoting action of the wheels 32 during steering movement. Due to the fact that the cross arm 82 is eight feet long, the forward antenna 78 extends forwardly of its associated wheel 32 by approximately four feet, and the reverse antenna 80 extends rearwardly of such wheel approximately a similar distance so that one of the antennas 78 or 80 always leads the wheel 32 depending upon the particular direction the system 10 is moving.

Only one of the antennas 78 and 80 receives the GPS signals at any given time as a switching relay (not shown) is utilized to activate the forward antenna 78 when the system 10 is moving in a forward direction and to activate the reverse antenna 80 when the system 10 is moving in a reverse direction.

Because of the location of the antennas 78 and 80 leading the associated steerable wheel 32, position information utilized by the signal receiving means 76 does not represent the exact position of the swing tower 30. Instead, such information represents a position that is forward or rearward of the wheel 32, which relationship is critical to the efficient and improved operation provided by the guidance system of the present invention by reducing the amount of overshoot that is realized in steering the swing tower 30 back to a desired path of travel 118 shown in FIG. 3. In known prior art, guidance systems that have the swing tower receiving means located directly on the swing tower in between the steerable wheels, the swing tower is steered toward the desired path of travel 118 until the tower reaches it. The guidance system then begins a change of the steering signals but the steerable wheels cannot be turned fast enough to prevent the swing tower from overshooting. Consequently, by placing the GPS antenna for the swing tower 30 in a forward position ahead of one of the steerable wheels, such overshooting is significantly reduced.

The position information provided by the signal receiving means 76 is supplied to the rover unit 74, which preferably is located in association with the swing arm tower 30. The unit 74 then generates position information of one of the antennas 78 and 80 using the correction factor that has been formulated by the receiving means 70 in conjunction with the position information signals received by either the forward antenna 78 or the rearward antenna 80 from GPS satellites 72.

Figure 6:
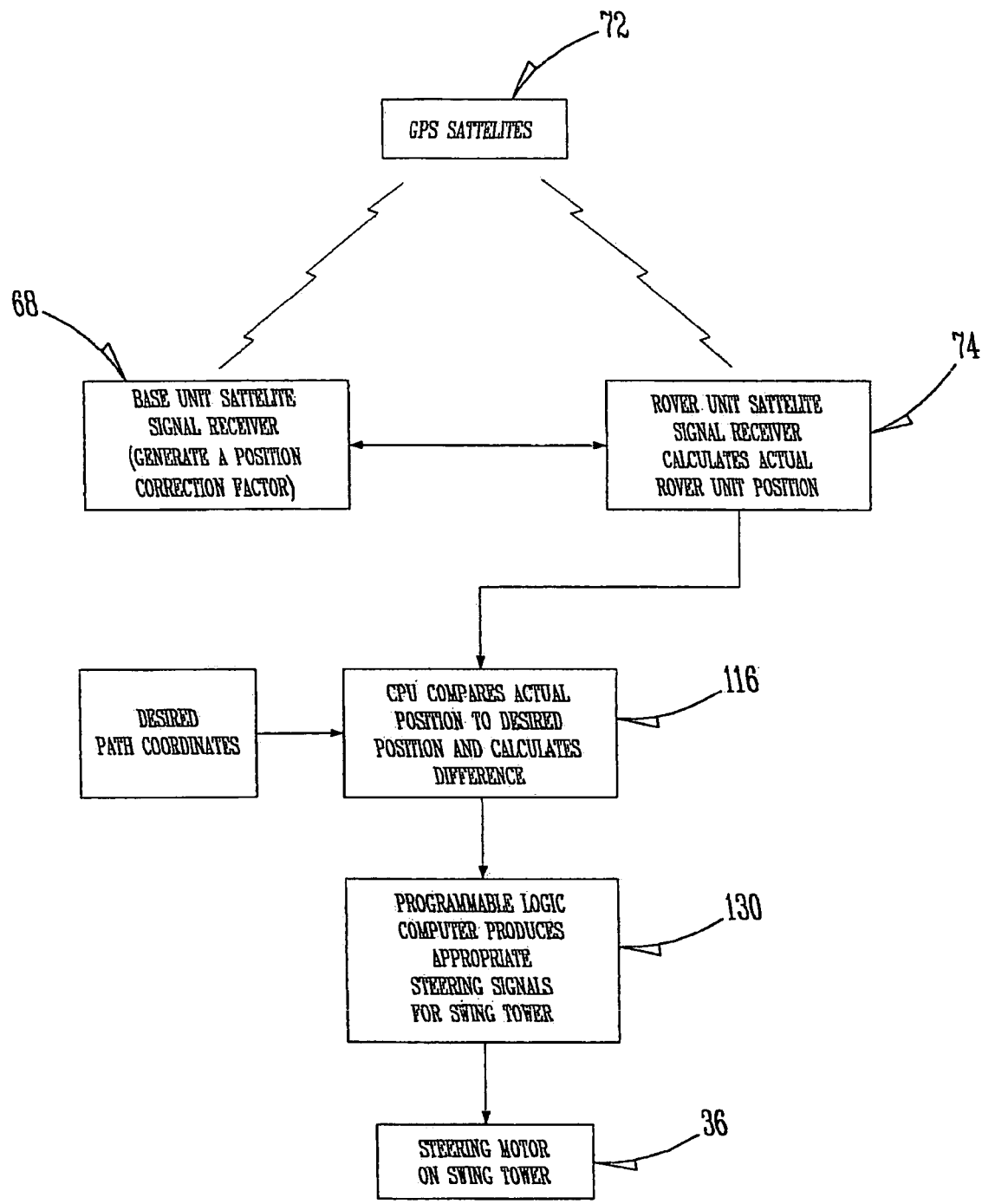
FIG. 6 is a Block diagram of the logic path for the first preferred embodiment of the guidance system of the present invention.

The position information produced by the rover unit 74 is in the form that represents the longitudinal and latitudinal coordinates of the forward or reverse antenna 78 or 80, depending upon the direction the system 10 is moving, and is accurate to within 2 centimeters of the true position of such antenna. Referring to FIG. 6, the position information of the rover unit 74 is supplied to a central processing unit 116, that is preferably located on the swing arm 26 as part of the rover unit 74 and preferably is a 386 computer in PC 104 format with two RS 232 communication ports.

In addition to receiving position information from the swing tower receiving means 76, the CPU 116 stores information representative of the desired path 118 (FIG. 3) for the swing arm 26, which path information is produced before the system 10 can be operational. The swing arm path information can be generated by walking the rover unit 74 around the field 58 along the desired path 118 or by using a computer simulation.

The CPU 116 is programmed so that during the initial walk through, it automatically calculates the distance of the forward antenna 76 and its azimuth with respect to the center pivot 12 for every 0.1 degree of the change of azimuth angle. Thus, in a 360 degree circle there will be 3600 location data pairs that are saved and stored in the permanent memory of the unit 116.

Another function of the CPU 116 is to compare the position information from the receiving means 76 to the stored desired path information. To be able to perform this comparison the CPU 116 is programmed to convert the position information from the means 76, which is in the format of a particular latitude and longitude, into the distance and azimuth format in which the desired path information is stored.

Figure 7:
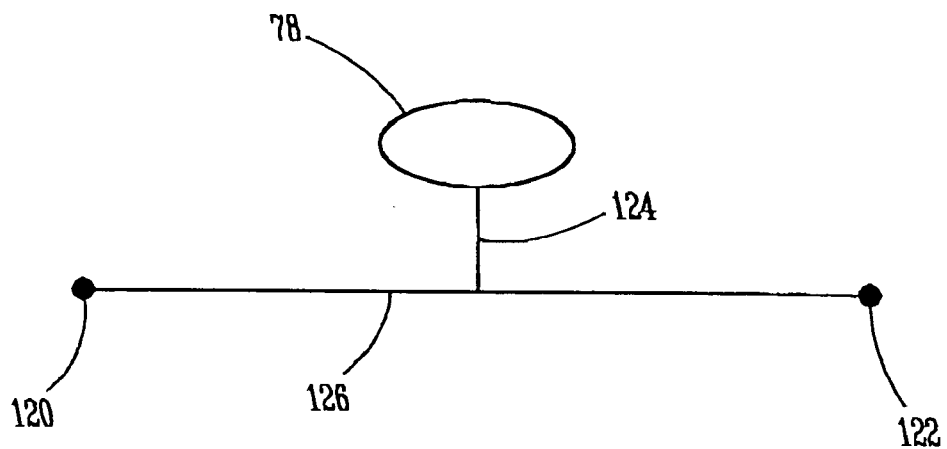
FIG. 7 is a diagrammatic view of the manner in which the guidance system of the present invention calculates steering signals for the swing arm.

Once the above path information conversion is made, the CPU 116 compares the value of the position information azimuth to that stored in memory to find the distance from the forward antenna 78 to a point midway between two selected points on the selected path of travel 118, one on either side of the azimuth calculated. For example, FIG. 7 shows a diagrammatic view of the type of calculation made by the CPU 116.

If the forward antenna 78 is located at a point 1,202 feet, AZ 123.3 degrees, preferably the CPU 116 will select points 120 and 122 on the path 118 which are located at AZ 120.2 degrees and AZ 120.4 degrees and then determine the perpendicular distance 124 from the antenna 78 to a line 126 drawn through the selected data points 120 and 122, which line 126 represents the distance of the antenna 78 from the preferred path of travel 118. If the location error is greater than a set point (for example 0.5 feet) then steering control occurs. Steering is always toward the selected data points, meaning a steer out if the antenna 78 is inside the data points 120 and 122 and a steer in if it is outside such data points.

Once the location error is determined, it is preferably transmitted to a programmable logic controller 130 designed to respond to the error distance by calculating steering signals that will cause a change in the steering of the swing tower 30 to most efficiently move it back to the intended path 118. The steering signals are supplied to the steering means 36 so that the guidance system of the present invention controls the direction of travel of the steerable wheels 32 of the swing tower 30 to move it back to the desired path 118. However, once one of the antennas 78 or 80 reaches the path 118, the steering control is altered as previously described to minimize any overshoot in travel by the tower 30.

Thus, the present invention provides a novel, efficient and accurate means for controlling the travel of a swing arm 26 on a center pivot irrigation system 10. Although the control means of the present invention has been described with respect to a preferred embodiment, it should be understood that such embodiment may be altered without avoiding the true spirit and scope of the present invention. For example, the CPU 116 and the logic controller 130 can be combined in a single module if so desired and other modifications to the electronics can be made as should be obvious to those skilled in the art. It is also important to note that use of GPS satellites 72 for controlling the position of the swing tower 30 also provides the system 10 with the ability to supply an optimum water pattern from the swing arm 26 depending upon its position. This is accomplished by sequencing the sprinklers 54 as the swing arm 26 moves into a corner as is well-known in the art.

What is claimed is:

1. A guidance system for providing steering control of a swing arm boom assembly for a center pivot irrigation system having a main arm water conduit with one end pivotally connected to a central point of water supply at a known location and supported on at least one movable tower, said system further comprising:
    (a) Said swing arm boom assembly including a water conduit supported by a drive tower having:
        (1) a generally horizontally aligned cross beam;
        (2) an upstanding wheel strut assembly located proximate each end of said cross beam;
        (3) at least one steerable wheel associated with the lower end of each strut assembly;
        (4) a steering assembly including a steering motor and means operatively connecting said motor to said wheels;
    (b) means for controlling said steering assembly to cause said drive tower to travel along a preselected path of travel, said control means comprising:
        (1) satellite signal receiving means, including a first GPS receiving antenna rotatably mounted on said swing tower, in a position that is continuously in front of at least one of said steerable wheels such that the position information received by said receiving means from said first antenna reflects locations that said one steerable wheel is moving toward when the drive tower is moving in a forward direction so that deviations of said swing tower from said predetermined path of travel are minimized; and
        (2) computer means associated with said receiving means to process position information from said receiving means to determine the position of said first antenna with respect to said preselected path of travel and provide an appropriate steering signal as a result thereof.

2. The guidance system as described in claim 1, wherein said first antenna is mounted on said swing tower in such fashion that its rotation is in direct relation to the steering movement of said one steerable wheel.

3. The guidance system as described in claim 1, wherein the movement of said first antenna is on a line of travel parallel to the line of travel of said one steerable wheel.

4. The guidance system as described in claim 1, wherein said receiving means further includes a second GPS receiving antenna mounted on said swing tower in a position to the rear of at least one of said steerable wheels such that the position information received by said receiving means from said second antenna reflects locations that said one steerable wheel is moving toward when the drive tower is moving in a rearward direction so that deviations of said swing tower from said predetermined path of travel are minimized.

5. The guidance system as described in claim 4, wherein said second antenna is mounted on said swing tower in such fashion that its rotation is in a direct relationship to the steering movement of said one steerable wheel.

6. The guidance system as described in claim 4, wherein said first and second antennas are spaced an equal distance from said one steerable wheel.

7. The guidance system as described in claim 3, wherein said steering assembly further includes steering arms that are pivotally associated with said wheel struts and a tie rod that connects said steering arms together to insure that the steering movements of said steerable wheels are synchronized.

8. The guidance system as described in claim 7, wherein said first antenna is mounted on one of said steering arms.

9. The guidance system as described in claim 3, wherein said computer means produces said steering signal by comparing the actual position of one of said first and second antennas to points located on said preselected path of travel.

10. The guidance system as described in claim 9, wherein said computer means compares the perpendicular distance of said one of said first and second antennas from a line that passes through two points that lie on said preselected path of travel on opposite sides of the actual position of said antenna.

* * * * *